Dec. 29, 1931.   L. BERKOWITZ   1,838,984
ROCKET MOTOR AEROPLANE
Filed March 20, 1931

INVENTOR
Louis Berkowitz
BY
ATTORNEY

Patented Dec. 29, 1931

1,838,984

UNITED STATES PATENT OFFICE

LOUIS BERKOWITZ, OF NEW YORK, N. Y.

ROCKET MOTOR AEROPLANE

Application filed March 20, 1931. Serial No. 523,967.

This invention relates to new and useful improvements in aeroplanes.

The invention has for an object the construction of an aeroplane which is characterized by a plurality of rocket motors to aid in propelling. It is proposed to arrange these motors along the wings and the body.

Another one of the objects of this invention is to direct the discharges from the rocket motors downwards to produce lifting and rearwards to cause forward motion.

A still further object is the provision of deflecting plates on the discharges from the rocket motors which are adjustable so as to control the propelling of the machine.

A still further object of this invention is to hingedly connect each of the deflecting plates on a ring, to provide a means for adjusting said ring rotatively, and a means to hold the deflecting plate in various inclined positions.

A still further object of this invention is to construct a device of the class mentioned which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Figure 1:
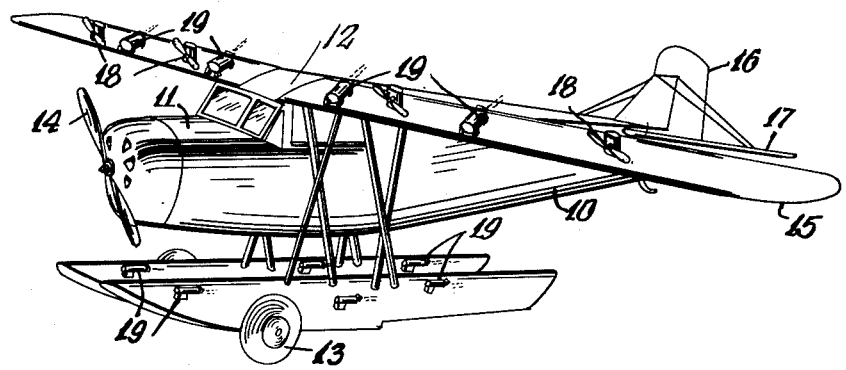
Fig. 1 is a perspective view of an aeroplane in flight and constructed according to this invention.
Figure 2:
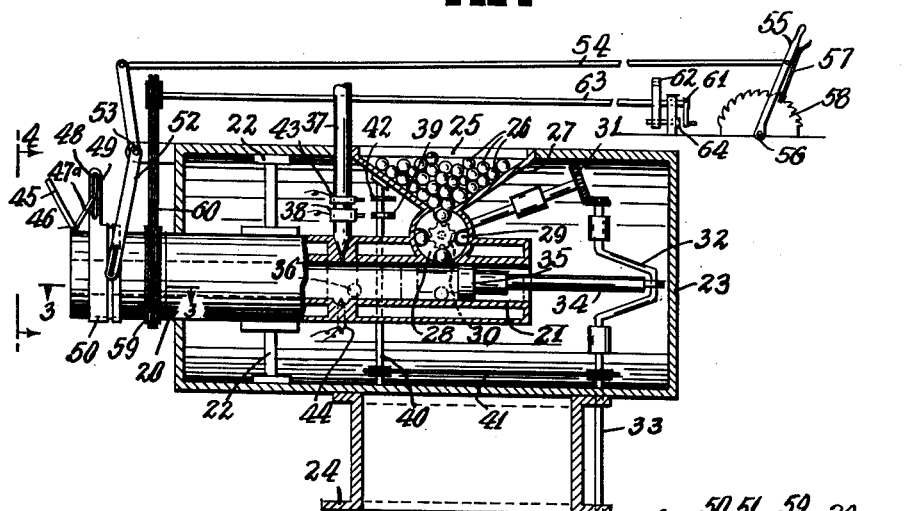
Fig. 2 is a longitudinal sectional view of one of the rocket motors.

In Fig. 1 an aeroplane has been disclosed which may be of any standard design and construction and is provided with rocket motors according to this invention. Numeral 10 indicates the hull of the aeroplane, 11 its body, and 12 the main wings. A landing gear 13 is arranged upon the hull. A motor driven propeller 14 is located at the front of the body 11. Ailerons 15 upon the main wings serve for the control of the machine. In addition, the aeroplane is provided with a rudder 16, and elevators 17. Several small motor driven propellers 18 are located upon the main wings.

A plurality of rocket motors 19 are attached to various parts of the aeroplane so as to be capable or discharging rearwards to cause forward motion of the machine and downwards to produce lifting forces. It is intended that the rocket motors supplement and aid the control of the machine in addition to the other propelling parts.

Each of the rocket motors comprises a projecting discharge tube 20 encircled by a water jacket 21 so as to prevent overheating. A complete cooling system is also necessary, but since this forms no part of the invention and is generally known in the art details thereof will be omitted. The projecting tube 20 is attached by brackets 22 within a casing 23. The front end of the tube projects from the casing. A support 24 is attached upon the bottom of the casing for attachment upon the flying machine. The casing 23 has a top door 25 through which rocket cartridges 26 may be entered within a hopper 27 within the casing. This hopper has at its lower end a roller 28 formed with longitudinal peripheral grooves 29 so that upon turning of the roller the rocket cartridges 26 may engage therein at the top and be discharged at the bottom within the projecting tube.

A gear 30 is fixed upon the shaft of the roller 28 and meshes with a transmission system 31 which includes a crank shaft 32 and a driver shaft 33 for connection with some source of rotation as a small electric motor or the like. The latter element is not shown on the drawings. A connecting rod 34 connects with the crank shaft 32 and with a piston 35 arranged to operate within the projecting tube 20. In the rearward condition or position of the piston 35, it is so located that rocket cartridges from the roller 28 may fall in front of it within the projecting tube. Then as the piston moves forwards, the rocket cartridge will be correspondingly moved to a plane, indicated by the dot and dash lines 36, and at this point suitable ignition means is provided for igniting the rocket.

The means for igniting the rocket comprises a gas pipe 37 terminating within the projecting tube in the vicinity of the cartridge and provided with a control valve 38. A cam 39 is fixed upon a shaft 40 connected by a transmission 41 with the shaft 33 so as to operate the valve 38 and allow injection of gas within the projecting tube. Another cam 42 is fixed upon the shaft 40 and is engageable with an electric switch 43 for connection with a spark plug 44 to ignite the gas and cause the igniting of the cartridge.

Figures 3, 4, 5:
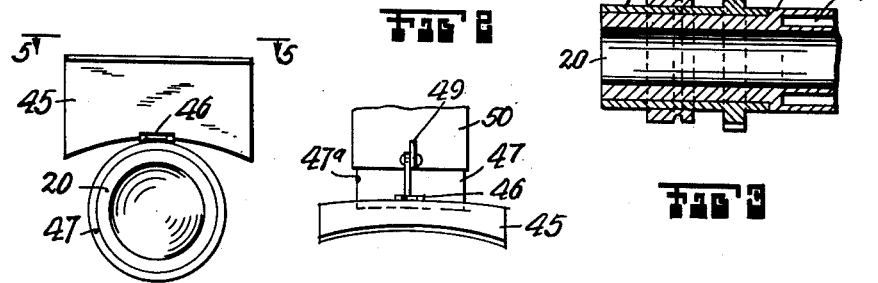
Fig. 3 is a fragmentary enlarged sectional view taken on the line 3—3 of Fig. 2.
Fig. 4 is a fragmentary elevational view looking in the direction of the line 4—4 of Fig. 2.
Fig. 5 is a fragmentary elevational view looking in the direction of the line 5—5 of Fig. 4.

A deflecting plate 45 is mounted upon the exit end of the projecting tube 20. This deflecting plate is of curved form as may be seen from Fig. 5, so as to be capable of deflecting the discharge from the projecting tube. The deflecting plate 45 is hinged at 46 upon a collar 47 rotative on the end of the projecting tube 20. A control is provided for holding the deflecting plate 45 in various angular positions and in various rotative positions upon the projecting tube so as to provide proper control of the device.

The means for angularly adjusting the plate 45 comprises a control arm 47ª projecting from the plate and provided with a pin engaging in an elongated slot 48 in a finger 49 projecting from a collar 50 rotative on the collar 47. The collar 50 is provided with a groove 51 engaged by a fork 52 which is pivotally supported at 53. A connecting rod 54 connects the fork 53 with a manual control lever 55 in the vicinity of the pilot of the craft. This control lever is pivotally mounted at 56 and has a catch 57 engageable with an arcuate rack 58 so as to maintain various adjusted positions.

The means for rotatively adjusting the plate 45 comprises the said collar 47 and a gear 59 fixed upon the collar. A transmission system which includes a chain 60 connects with the gear and terminates in a control handle 61 also in the vicinity of the pilot of the craft. A catch is provided for holding the control 61 in various rotative positions and comprises a disc 62 fixed upon one of the transmission shafts, indicated by reference numeral 63. A pin 64 from a standard which supports the shaft 63 is engageable with the disc 62 to hold the disc latched in various desired positions.

In operation of the aeroplane, the rocket motors may be set in operation so as to aid in its propelling. The rocket discharges can cause the aeroplane to travel at very great speeds. The various deflecting plates 45 from the discharging tubes of the rocket motors may be set according to different flying conditions. If it is necessary these plates may assume positions in which they do not interfere with the discharges from the projecting tubes, or they may assume positions in which they deflect these discharges in any desired direction and at any desirable angle. Considering each motor independently, upon adjustment of the hand lever 55, the fork 52 will move so as to cause the collar 50 to move longitudinally on the collar 47. Such longitudinal movements will cause the deflecting plate 45 to assume various positions upon its hinge 46. In any of these adjusted positions, the control 61 may be turned to cause the collar 47 to assume different rotative positions and in this manner the rotative position of the deflecting plate may also be adjusted.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a device of the class described, a projecting tube, means for injecting rocket cartridges therein, means for igniting said charges, a deflecting plate on at the exit of said projecting tube, means for angularly adjusting said plate, and means for rotatively adjusting said plate.

2. In a device of the class described, a projecting tube, means for injecting rocket cartridges therein, means for igniting said charges, a deflecting plate on at the exit of said projecting tube, means for angularly adjusting said plate, and means for rotatively adjusting said plate, said means for injecting rocket cartridges within the projecting tube comprises a hopper for holding cartridges, a roller closing the bottom end of the hopper and in communication with the projecting tube and formed with longitudinal grooves into which the rockets may engage so that on rotation the rockets move from the hopper and discharge into the projecting tube.

3. In a device of the class described, a projecting tube, means for injecting rocket cartridges therein, means for igniting said charges, a deflecting plate on at the exit of said projecting tube, means for angularly adjusting said plate, and means for rotatively adjusting said plate, said means for injecting rocket cartridges within the projecting tube comprises a hopper for holding cartridges, a roller closing the bottom end of the hopper and in communication with the projecting tube and formed with longitudinal grooves into which the rockets may engage so that on rotation the rockets move from the hopper and discharge into the projecting tube, and a means for turning said roller synchronized with the means for igniting the charges.

4. In a device of the class described, a projecting tube, means for injecting rocket cartridges therein, means for igniting said charges, a deflecting plate on at the exit of said projecting tube, means for angularly adjusting said plate, and means for rotatively adjusting said plate, said means for igniting said charges comprises a gas supply, means for controlling said gas supply to inject gas within the tube at the moment that the rocket charge is to be ignited, and means for igniting the gas at this moment.

5. In a device of the class described, a projecting tube, means for injecting rocket cartridges therein, means for igniting said charges, a deflecting plate on at the exit of said projecting tube, means for angularly adjusting said plate, and means for rotatively adjusting said plate, said means for angularly adjusting said plate comprises an arm connected with the plate and having a pin engaging in an elongated slot on a finger projecting from a collar slidable on said projecting tube, and means for holding said collar in various longitudinal positions.

6. In a device of the class described, a projecting tube, means for injecting rocket cartridges therein, means for igniting said charges, a deflecting plate on at the exit of said projecting tube, means for angularly adjusting said plate, and means for rotatively adjusting said plate, comprising a gear fixed on a collar hingedly supporting said deflecting plate, and means for holding said collar in various rotative positions.

In testimony whereof I have affixed my signature.

LOUIS BERKOWITZ.